US008744936B2

(12) United States Patent
Guion et al.

(10) Patent No.: US 8,744,936 B2
(45) Date of Patent: Jun. 3, 2014

(54) BILLING METHOD AND DEVICE IN A CELLULAR PACKET RADIOCOMMUNICATION NETWORK

(75) Inventors: Christian Guion, Verrieres le Buisson (FR); Ghazi Ben Amor, Paris (FR); Alain Rhelimi, Cachan (FR); Omar Habbal, Le Plessis Robinson (FR)

(73) Assignee: Gemalto SA, Meudon (FR)

( * ) Notice: Subject to any disclaimer, the term of this patent is extended or adjusted under 35 U.S.C. 154(b) by 1651 days.

(21) Appl. No.: 10/492,387

(22) PCT Filed: Oct. 9, 2002

(86) PCT No.: PCT/IB02/04163
§ 371 (c)(1),
(2), (4) Date: Apr. 9, 2004

(87) PCT Pub. No.: WO03/034685
PCT Pub. Date: Apr. 24, 2003

(65) Prior Publication Data
US 2004/0210528 A1    Oct. 21, 2004

(30) Foreign Application Priority Data
Oct. 12, 2001    (FR) .................................... 01 13219

(51) Int. Cl.
*G06Q 40/00*    (2012.01)
(52) U.S. Cl.
USPC .......................................... 705/35; 455/406
(58) Field of Classification Search
CPC ....................................................... G06Q 40/00

USPC ................ 705/40, 35; 455/406, 405; 709/228
See application file for complete search history.

(56) References Cited

U.S. PATENT DOCUMENTS

| 5,845,267 | A  | * | 12/1998 | Ronen ............................. 705/40 |
| 6,088,687 | A  | * | 7/2000  | Leleu .............................. 705/400 |
| 7,565,134 | B2 | * | 7/2009  | Hurtta et al. .................. 455/405 |
| 2001/0023407 | A1 |   | 9/2001  | Liyanearachchi et al. |
| 2001/0023417 | A1 |   | 9/2001  | Stefik et al. |
| 2001/0044779 | A1 | * | 11/2001 | Iima et al. ........................ 705/52 |
| 2001/0054148 | A1 | * | 12/2001 | Hoornaert et al. ............. 713/172 |

(Continued)

FOREIGN PATENT DOCUMENTS

EP        1143692 A2    10/2001
WO    WO9528062 A2    10/1995

OTHER PUBLICATIONS

PCT/IB0204163 International Search Report May 30, 2003 European Patent Office, P.B. 5818 Patentlaan 2 NL-2280 HV Rijswijk.

*Primary Examiner* — Bruce I Ebersman
*Assistant Examiner* — John Anderson
(74) *Attorney, Agent, or Firm* — The Jansson Firm; Pehr B. Jansson

(57) ABSTRACT

This invention proposes a method to obtain the cost of transmitting a set of data from a transmitting means (2, 3, 16) to a receiving means (2, 3, 16) via a network (4), which consists of creating and sending with the set of data itself a data item, called a ticket (19, 23), used to determine the volume and/or the value of said set of data transmitted. Using said ticket, the receiving means can take into account the cost of executing said set of data thereby simplifying the billing. This invention also concerns the systems used to implement said method especially in cellular packet radiocommunication networks.

12 Claims, 4 Drawing Sheets

(56) References Cited

U.S. PATENT DOCUMENTS

| | | | |
|---|---|---|---|
| 2002/0022471 A1* | 2/2002 | Watler et al. | 455/405 |
| 2002/0133598 A1* | 9/2002 | Strahm et al. | 709/228 |
| 2002/0155823 A1* | 10/2002 | Preston et al. | 455/406 |
| 2002/0187775 A1* | 12/2002 | Corrigan et al. | 455/414 |
| 2003/0055735 A1* | 3/2003 | Cameron et al. | 705/26 |
| 2005/0136949 A1* | 6/2005 | Barnes, Jr. | 455/461 |
| 2006/0168303 A1* | 7/2006 | Oyama et al. | 709/231 |

* cited by examiner

BILLING METHOD AND DEVICE IN A CELLULAR PACKET RADIOCOMMUNICATION NETWORK

BACKGROUND OF THE INVENTION

1. Field of the Invention

The invention concerns a method and a device for the billing of services and especially of Internet services used by a mobile telephony station in a cellular packet radiocommunication network.

2. Description of the Related Art

This invention applies to GPRS (General Packet Radio Services) cellular communication networks, EDGE (Enhanced Data rate for GSM Evolution), UMTS (Universal Mobile Telephone Standard), CDMA 95 and 2000 (Code Division Multiple Access), WCDMA (Wideband CDMA), 3GPP (Third Generation Partnership Program—European version), 3GPP2 (North American model of 3GPP), or other.

In cellular radiocommunication systems such as GSM (Global System for Mobile Communications), the voice signals and data use the same transmission path: the infrastructure which is quite suitable for the voice signals is not fast enough for data transmission. The cellular packet radiocommunication networks were therefore introduced to process data.

However, a problem arises in the cellular packet radiocommunication networks when the content and volume of the data transmitted must be measured.

The rates applied to the various services, and especially the Internet services, depend on the provider, the user, various reductions or special offers available, the period during which the service is requested (peak/off peak period). In addition, the rates are likely to change at any time, depending on the market situation.

Also, the volume and the content of the data transmitted must be billed to the user customer. Unlike the GSM type switching networks, in which the measurement is carried out on the basis of the time elapsed during a connection between two points, packet switching involves direct measurement of the volume of data transmitted, i.e. more precisely the number of packets transmitted. Moreover, the packets must be allocated to a given origin, bearing in mind that several transmitters may be active simultaneously.

Consequently, billing in a packet network involves measuring instantaneously and at each connection interface of the telephony network to the Internet, the flow transmitted or received, consolidating it and evaluating it according to complex rules as seen above at a single point called a collection unit from which the bill is issued.

In case of deferred billing, although complex and heavy, billing is nevertheless feasible since the collection unit has several days or hours to make out the bill. However, when the billing procedure is carried out in real time, a much more expensive infrastructure is required.

In this context, one objective of this invention is to propose a method and a simple, low-cost device for real time billing of the services required by receiving means from transmitting means in a cellular packet radiocommunication type network, Internet or other.

One objective of this invention is to propose a method and a simple, low-cost device for real time billing of the services required by a mobile radiotelephony station in a cellular packet radiocommunication type network.

SUMMARY OF THE INVENTION

In this context, this invention proposes a method to obtain the cost of transmitting a set of data from a transmitting means to a receiving means via a network, wherein it consists of creating and sending with the actual set of data a data item, called a ticket, used to determine the volume and/or the value of said set of data transmitted.

This invention also concerns a system to implement said method.

BRIEF DESCRIPTION OF THE DRAWINGS

Other features and advantages of the invention will appear on reading the description which follows given for illustration and as a non-limiting example of this invention, and referring to the attached drawings in which.

DESCRIPTION OF THE INVENTION

This invention applies, although not exclusively, to mobile telephony stations in compliance with the "GPRS" standard. It must be clearly understood however that the invention is not limited to this application alone. In particular, it may be used in other standards such as those indicated above. It can also be applied to various fields in mobile telephony, for example to the field of data packet communication networks such as the Internet, or other.

In the remainder of this document, this invention will be described and illustrated in the context of the GPRS/Internet network.

Figure 1:
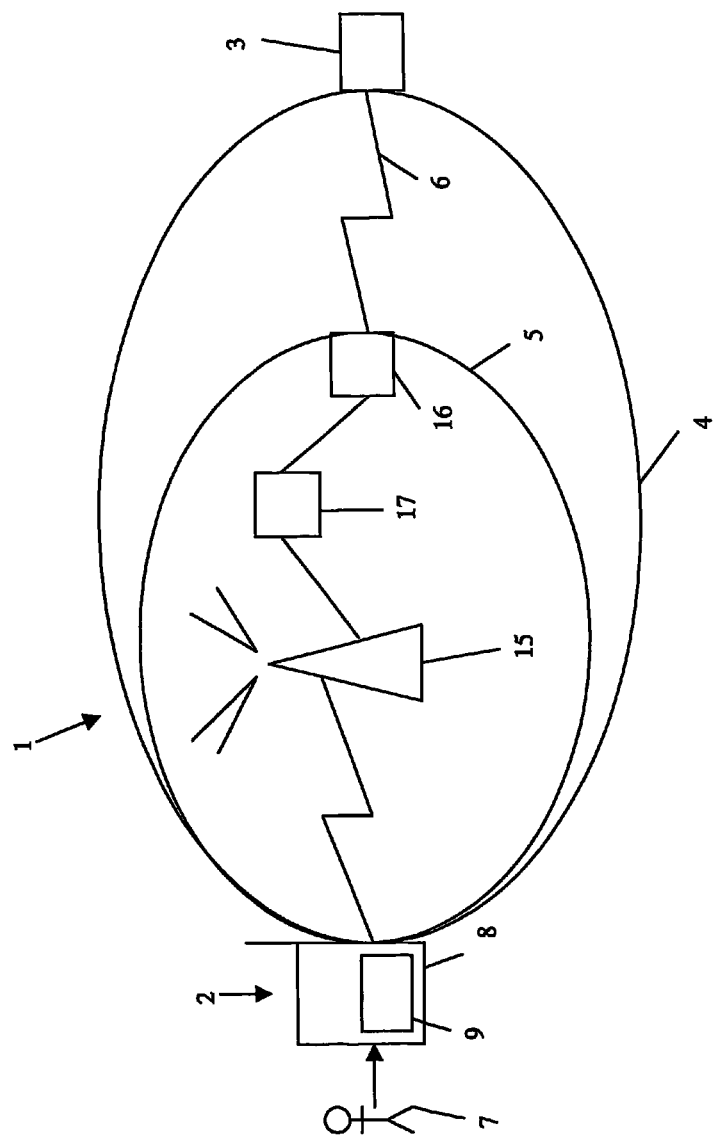
FIG. 1 is a diagrammatic view of one form of realisation of the system according to the invention.
Figure 3:
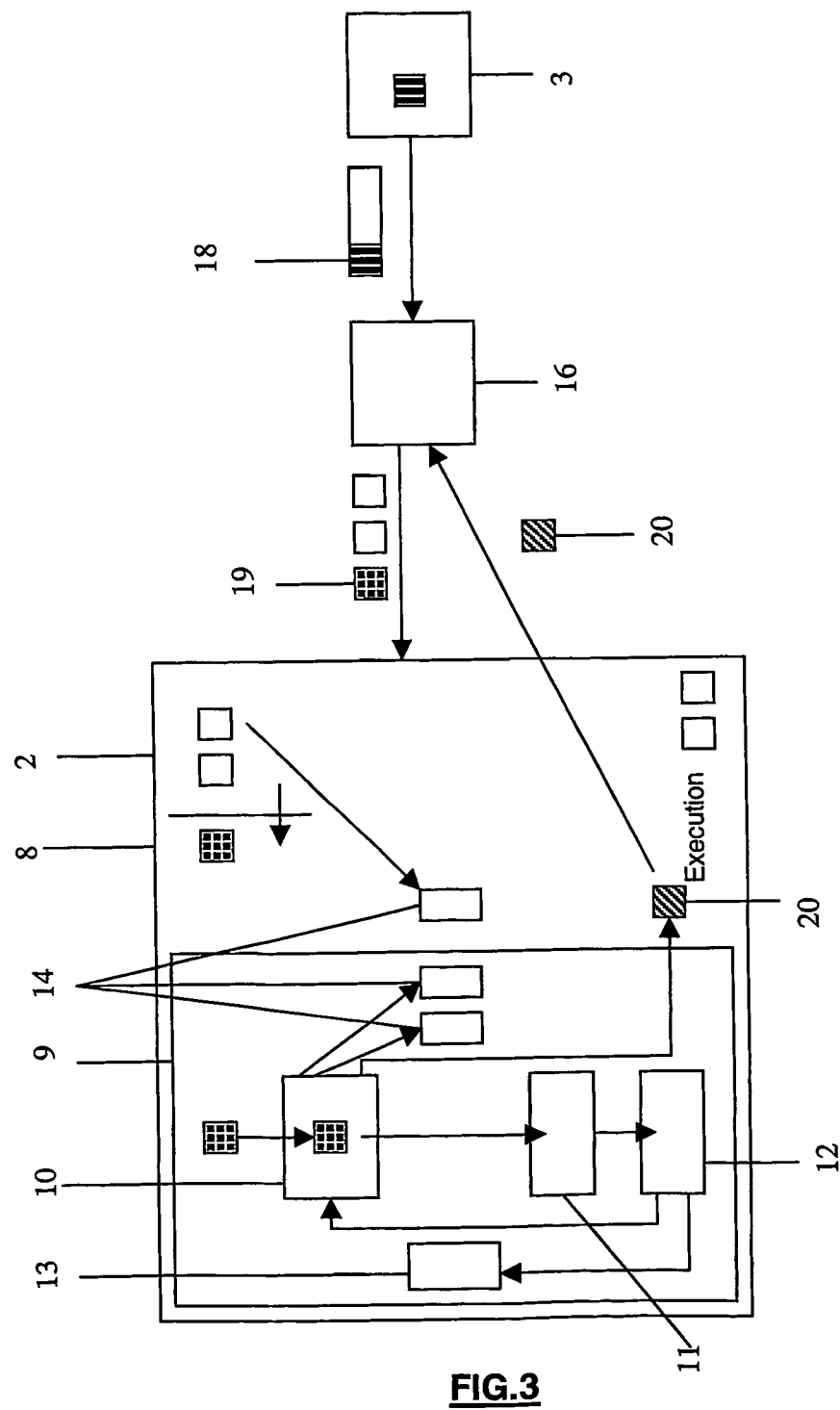
FIG. 3 is a diagrammatic view of the system according to FIG. 1 in which the main steps of the method according to FIG. 2 are shown.

As shown in the form of realisation of the system according to the invention illustrated on FIGS. 1 and 3, the system 1 includes receiving means 2, i.e. in the example illustrated a mobile telephony station 2 and transmitting means 3 which, in the example illustrated, are a service provider 3. The station 2 and the provider 3 are connected by a network 4. As shown on FIG. 1, the network 4 includes a GPRS network 5 and an Internet network 6.

The station 2 belongs to and is used by a user 7. The mobile telephony station 2 includes a mobile telephone 8 and a SIM card 9.

The SIM card 9 is a smartcard equipped with information processing and storage means, including a module known under the abbreviation "SIM" (Subscriber Identity Module). The SIM card stores a certain number of data items concerning the telephone subscription as such (name(s) of operator(s) that the subscription(s) have been taken out with, subscription type, subscriber identification data, etc.), as well as so-called embedded applications. In the particular form of realisation illustrated on FIG. 3, the SIM card 9 includes a cryptographic module 10 enabling said card to sign/authenticate and encrypt/decrypt the messages transmitted or received by the SIM card. According to a particular form of the invention, the SIM card 9 includes a module 11 containing the access rights of the user 7 to all types of application and in this example to services of service providers 3. The card 9 includes a module 12 containing the financial rights of the user 7: the module 12 takes the form, for example, of an electronic purse which can be credited with a bank or other card inserted in an auxiliary reader of the telephone 8, or via a secured link with a financial organisation capable of downloading a certain amount of money into said purse. The module 12 may also take the form of a counter of amounts consumed by the card 9 and billed periodically. Optionally, the card 9 includes means 13 to store a log. The card 9 stores in said log the latest operations carried out by a given provider. The log contains, for example, the date of the operation, the provider's address, the financial value consumed by the card 9 and the number of packets.

In the remainder of the document, a subscriber card 9 is a card offering the functions of the SIM card described above. Thus, a subscriber card may also be, for example, a USIM card.

The telephone 8 and the subscriber card 9 include counters 14 intended to store the number of GPRS packets received, how they were received, or any other information concerning the reception of information from the GPRS network. The counters 14 take various forms, for example GPRS packet counters.

Figure 4:
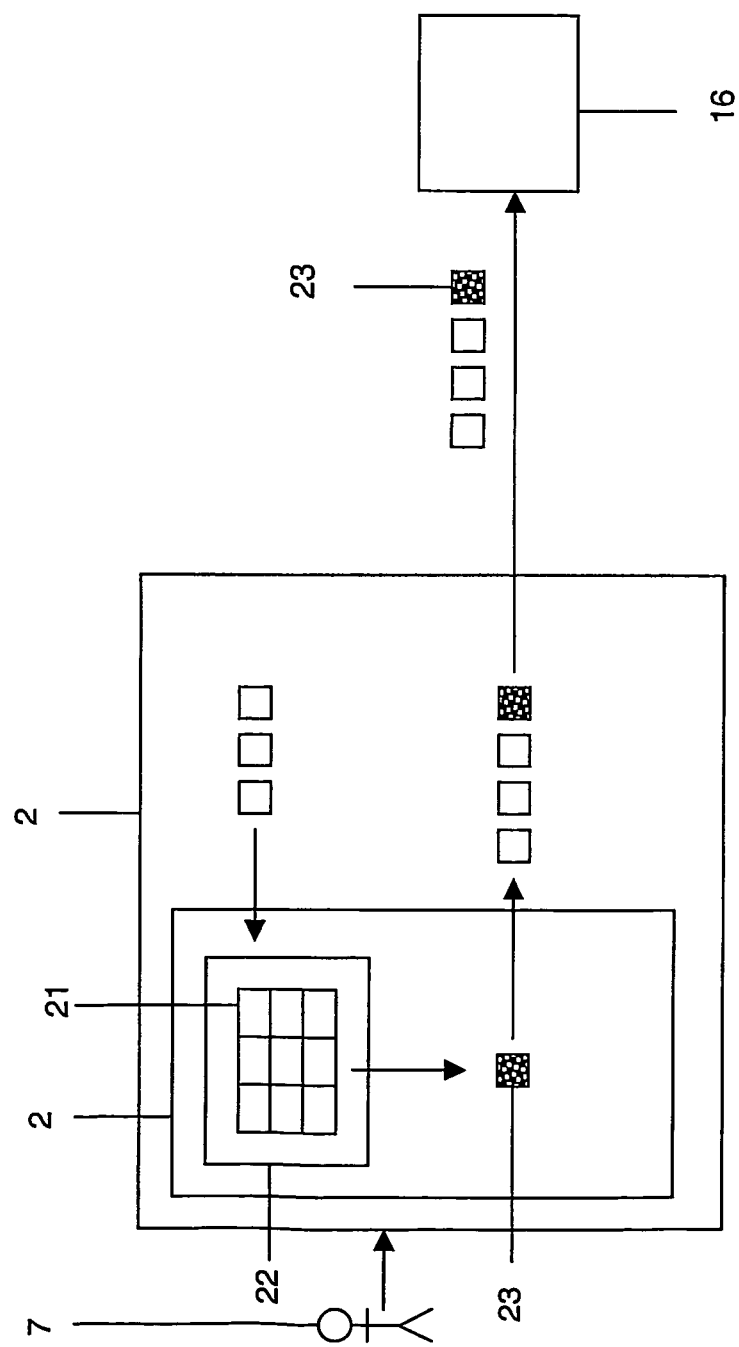
FIG. 4 is a diagrammatic view of the system according to FIG. 1 in which the main steps of one form of realisation of a method according to this invention are shown.

As illustrated on FIG. 4, the system also includes means 22 to store a table 21 setting the value of data transmitted from the station 2 according to specific details.

The GPRS network 5 includes an antenna 15 to broadcast GPRS messages, an injection/collection unit 16, hereafter referred to as the unit 16, in the form of a GGSN (Gateway GPRS Support Node) module 16 acting as interface between the GPRS network and the Internet network. The GGSN module 16 is the point of access to the GPRS network for the provider 3: this is why the GGSN module was chosen as will be seen below to inject tickets into the messages from a provider 3 and to collect the return elements from the station. The module 16 can subcontract all or some of the functions assigned to it in this invention. The functions of unit 16 can therefore be carried out by any other component under the control of the GGSN module 16 such as, for example, an SGSN (Serving GPRS Support Node) module 17 or even by several components, each component performing some of said functions (for example, a ticket injection unit, a ticket collection unit, a billing unit could be planned, etc.). The GPRS network 5 includes several components between the antenna 15 and the GGSN module 16 such as the SGSN modules 17 for example.

Figure 2:
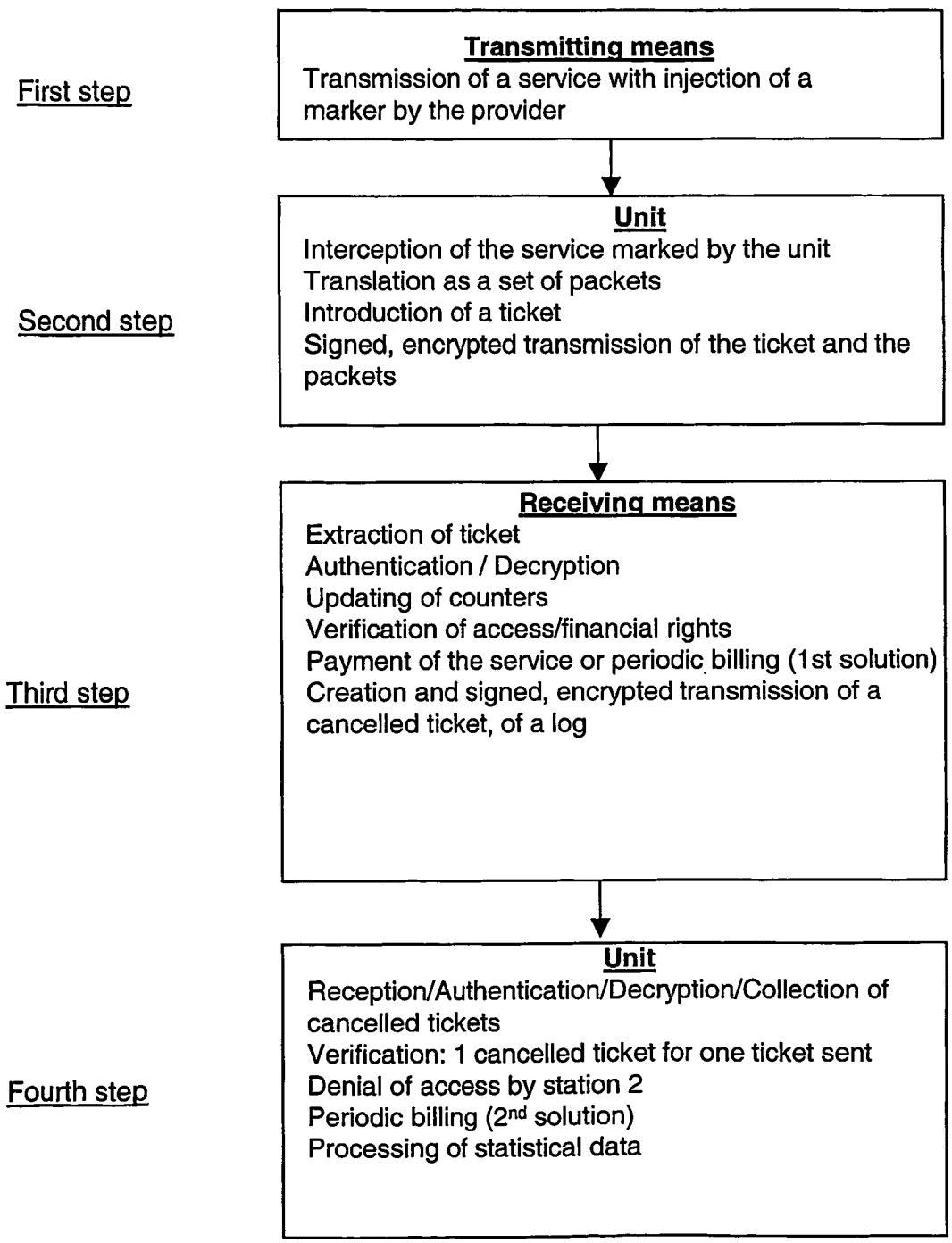
FIG. 2 is a diagram illustrating the main steps of one form of realisation of a method according to this invention.

The method used to bill the services sent to the station 2 and illustrated on FIGS. 2 and 3 is executed as follows.

In a first step, for each provider 3, the price of sending a set of data is fixed for said provider 3 and sent with the data flow itself. In the example illustrated on FIGS. 2 and 3 therefore, the service provider 3 injects a marker 18 in the service sent to the station 2. The marker 18 contains information on the value of the service such as, for example, "N euros or centimes for the packets".

In a second step, the service is intercepted by the unit 16. The purpose of the unit 16 is to translate the messages received in a format specific to the Internet (or other) network 6 into messages with the format of the GPRS cellular packet radiocommunication network 5. The unit 16 translates the service received into a set of GPRS format packets and injects into this set a packet, hereafter referred to as a ticket 19, designed in particular to transmit the information of the marker 18. The ticket can be placed at the start or the end of a set of packets corresponding to a given service, or even in said set. In the form of realisation illustrated, the ticket is placed at the start of transmission. The ticket contains in particular some or all of the following elements: its rank in the set of packets transmitted, the identify of the service provider 3, the number of packets attached to said ticket, the value of the content of said set (the services may have different prices depending on their types), the certificate of the unit 16 (if the message is protected by asymmetric cryptography, as will be seen below), the serial number of said packets, the value of the packets to be returned to provider 3, and/or any other useful information, the type of the content of the packets transmitted (visible by all, adults only, special professional categories (doctors, etc.)). In the example illustrated on FIG. 3, the ticket 19 contains the following information: rank=1, identity=provider 3, number=2, value=10F, etc.

Concerning the serial number of the packets, packets transiting via the unit 16 have sequential numbering. Depending on their order of arrival, serial numbers can be produced in bulk or by transmitter type, and it is even possible to maintain specific numbering for the associated tickets.

Concerning the identity of the provider 3, the packets transiting in the Internet network 6 using the TCP/IP protocol contain the provider's address; other information can be used to trace the provider such as, for example, the serial number of the IP packets in order to find the type of information transmitted by reference to predefined tables.

Advantageously and optionally, the ticket 19 contains redundancy information on packets already transmitted. Checks can therefore be carried out by the station 2 on reception of said ticket 19 regarding the packets previously received (their number, their transmitter, etc.).

In case of free access to the service, the unit 16 uses a predetermined value, for example the value 0, which it injects in the ticket 19 to indicate to the station 2 that the access is free. In this case, the operator must contact the service provider regarding the payment for transport of the service. In the other cases, agreements are signed between the operator and the provider regarding the billing of the provider's services: with periodic billing for example, the operator can produce and send the bill to the user and cross charge it to the provider concerned or it can send the billing details to the provider and only bill the provider or the user for the transport of the service. Numerous agreements are possible.

The unit 16 signs and protects by encryption the data it sends to the station 2. According to a special form of realisation, it uses a signature and encryption with secret keys; in this case, the unit 16 and the station 2 have secret keys. According to another form of realisation, it uses asymmetric cryptography: in this case, the ticket 19 contains the certificate of the unit 16 as seen above; the collection unit 16 and the station 2 have pairs of asymmetric keys.

The first and second steps therefore consist of creating and sending a ticket 19 to the station 2.

The third step which follows consists of processing said ticket 19 by the mobile telephone 8.

In the third step (FIGS. 2 and 3), the station 2 and more especially the mobile telephone 8 receive the set of packets in question. Each packet contains the identity of the provider 3 so that the telephone 8 can process independently the flow of several providers 3 communicating simultaneously with the station 2. The telephone 8 extracts the ticket 19 and sends it to the subscriber card 9.

The cryptography module 10 of the subscriber card 9 first checks the signature of the unit 16 contained in the ticket 19. If the unit 16 is correctly authenticated, the content of the set of packets is decrypted. The telephone 8 and the subscriber card update the counters 14.

The subscriber card checks the access rights and the financial rights of the user 7 with respect to the indications of the ticket 19. The card analyses the type of the content of the packets given by the ticket 19 and the user's access rights stored in the module 11. Depending on the access rights stored and the type of the content of the packets received, the user is granted or denied access to the service received by the card 9.

Module 12 of the subscriber card then checks the user's financial rights. Several solutions are possible as seen previously.

If the card 9 contains a prepaid purse 12, the card debits the purse by the amount corresponding to that indicated in the ticket. The amount indicated by the ticket 19 is expressed in number of packets and/or in financial value. The purse 12 is a hardware and/or software means used to store purchasing power.

If the user 7 is billed periodically, two solutions are possible; the first one is as follows. The subscriber card totals and saves in the module 12 the amounts corresponding to the volume and/or to the value of the packets transmitted indicated in the tickets for each provider 3. At the time of billing, the subscriber card sends the total saved to the provider 3. In the second solution, the provider or the operator are responsible for producing the bill, as will be seen below.

According to a special form of realisation of the invention, the provider 3 subcontracts the billing to a specific billing unit and/or to components of the operator.

In the event of free access, the subscriber card deduces from the ticket (value 0) that the access is free. No financial operation is carried out.

Note that said operations in the third step (some or all of the operations carried out by the subscriber card) can also be carried out by a module included in the mobile telephone.

The ticket 19 thereby enables the station 2 to determine the volume and/or financial value of the content of all packets transmitted by the provider 3.

If the user's access rights and financial rights authorise him to access the service received and the amount required to execute the service has been debited or saved, the subscriber card 9 indicates this to the mobile telephone 8: the mobile telephone 8 executes the service concerned using the packets received.

If the ticket is placed at the start of transmission as shown on FIG. 3, the subscriber card 9 must contain a sufficient amount in order to execute all packets which follow the ticket 19. Otherwise, said packets are not executed. In this way, the provider ensures that all packets executed are paid for and has no losses. However, execution of packets must wait until the ticket 19 is processed by the subscriber card 9.

If the ticket is placed at the end of transmission, all packets are executed irrespective of the financial rights of the subscriber card 9. The method is faster but the provider must expect losses due to execution of packets without sufficient financial rights and therefore without corresponding debit.

The subscriber card 9 creates, encrypts and signs a "cancelled" ticket 20 using the cryptographic module 10 and communicates it to the telephone 8. The ticket 20 is "cancelled" since it contains information showing that the packets have been used and indicating the ensuing results.

The mobile telephone 8 sends said cancelled ticket to the unit 16. According to the example illustrated on FIG. 3, transmission of the cancelled ticket 20 means that the ticket 19 sent has been processed, that the purchasing power of the user 7 was sufficient, that the user 7 had access to the service (i.e. that the packets corresponding to the ticket 19 sent were executed), that an amount corresponding to execution of the packets received has been debited or taken into account.

According to a special form of realisation, the cancelled ticket 20 contains to accumulated total of the value and/or the volume of all packets received for a given provider. The ticket 20 may also contain denial of access to the service received to the user by the station 2. The ticket also contains statistical elements, and more particularly the results of the counters 14 of the subscriber card 9 and of the mobile telephone 8, i.e. for example the number of packets received, the number of packets not received completely, etc.

In a fourth step, the unit 16 receives the cancelled ticket 20. A return element (cancelled ticket) is generated for each ticket sent. If the unit 16 does not receive a return element, it interrupts the traffic in progress for the station 2 in question. If no return element is sent, this means that either the user does not have sufficient purchasing power (if the denial indication is not given in a cancelled ticket) or a problem has occurred. On reception of a cancelled ticket, the unit 16 authenticates said ticket 20, checking the signature of the subscriber card. If the authentication is successful, the unit 16 decrypts said ticket 20 and stores it. If the ticket indicates that access to the station 2 was denied, the unit 16 stops the transmission of the message from the provider 3 concerned to the station 2 in question.

In case of periodic billing (every month for example), according to the second solution (see the first solution above), the operator responsible for the GPRS network 5 or the provider 3 queries all the units 16, one of their functions being to collect the cancelled tickets in order to obtain all the cancelled tickets received last by said units for a given user 7 and provider 3. As seen above, each ticket corresponds in the example described to the last billing status.

In addition, the unit 16 processes the statistical elements received to obtain information on the quality of service or any other type of information obtained from station 2. It may, for example, compare the number of tickets 19 sent with the number of cancelled tickets 20 received, or calculate statistics on how the tickets were received by station 2.

The method used to bill the messages sent from the station 2 and illustrated on FIG. 4 is executed as follows.

Station 2 transmits data, for example electronic mails. As previously, the user 7 must pay for the transmission of this data by the GPRS network 5. In this case, only the volume of data transmitted is billed. The financial value of this data is fixed since the data transmitter does not change and we are concerned with the user of station 2. However, other elements, such as the data transmission period, may be taken into account. If the data is transmitted at off-peak time, it is less expensive than if sent at peak time. A table 21 is therefore planned in the subscriber card. Table 21 determines a value for the data transmitted by the station 2 according to certain details such as the transmission period.

The mobile telephone 8 requires a ticket 23 from the subscriber card 9 to send a set of packets. The subscriber card checks that the financial rights authorise the station to transmit the packets concerned.

For a card 9 containing a purse 12, the subscriber card debits the purse by the amount corresponding to the transmission of the packets concerned.

For periodic billing, the subscriber card totals and stores the amounts corresponding to the transmission of packets in module 12. At the time of billing, the subscriber card sends the total saved to the operator.

A ticket 23 is generated by the subscriber card according to the number of packets to be transmitted and information contained in said table 21 (if any). The mobile telephone 8 sends the ticket 23 and the associated packets. The ticket, sent at the start of the message, indicates in this case hat the subscriber card has debited the amount of the transmission or that it has taken it into account. Consequently, when the unit 16 receives the ticket, it knows that it can allow the message to pass. The billing was produced in the mobile station 2.

According to a special form of realisation of this invention, the station 2 transmits to the unit 16 the content of the log 13 of the subscriber card 9 during any communication of the station 2. The information transmitted is certified and dated by the card 9.

The statement so transmitted reduces the later billing operations. This special form of realisation involves transmitting a large amount of data from station 2. However, considering that the traffic is highly dissymmetric, this is not a disadvantage: the volume of data received by the station 2 is much greater than the volume of data it transmits.

This invention therefore concerns a method to obtain the cost of services received by a mobile telephony station 2 in a cellular packet radiocommunication network 5, the service being transmitted from a service provider 3, wherein it consists of marking the price of the service required from the provider by injecting a price marker in the flow of data itself.

A unit in the network intercepts the marker and the data received from the Internet type network to reformat them as packets in which a packet called a ticket is injected, to determine the volume and/or the value of the data transmitted and/or any other useful information.

This invention also concerns a method to obtain the cost of services received by a mobile telephony station in a cellular packet radiocommunication network, the service being transmitted from a service provider, wherein the station 2 saves the cost of executing a set of data received by said station using information contained in a ticket received by the station 2.

The cost of execution saved by the station 2 simplifies the billing.

The method saves the cost of execution by debiting a purse by an amount obtained using the ticket received.

The method saves the cost of execution by storing the sum of the cost obtained from the ticket received and the total costs already saved.

This invention therefore concerns a method to obtain the cost of services transmitted or received by a mobile telephony station 2 in a cellular packet radiocommunication network 5, wherein the station 2 creates and sends with a set of data an additional data item called a ticket 19, 23 in order to determine the volume and/or the value of said set of data transmitted by the station 2.

This invention concerns the systems used to implement said methods described especially in the field of cellular packet radiocommunication networks.

This invention proposes a method to obtain the cost of transmitting a set of data from a transmitting means 2, 3, 16 to a receiving means 2, 3, 16 via a network 4, wherein it consists of creating and sending with the set of data itself a data item, called a ticket 19, 23, used to determine the volume and/or the value of said set of data transmitted.

The method consists of checking the financial rights of the receiving means and comparing the purchasing power of said means with the amount required to execute said set of data received, amount indicated by said ticket 19.

The method consists, before checking the financial rights, of checking the access rights of the receiving means to said set of data received.

The method consists of saving in a module 12 of the receiving means the volume and/or the value of said set of data transmitted and of transmitting the stored data in order to determine the cost of the transmission.

The ticket 19 also contains one or more of the following items of information: its rank in the set of data transmitted with the ticket, the identity of the transmitting means, the certificate of the transmitting means, the serial number of said packets, the value of the packets to be returned to the receiving means, the type of data transmitted.

The method consists of updating counters 14 of information concerning reception of the ticket and of said set of data in the receiving means.

When the receiving means which have received said ticket 19 have executed the data transmitted, said receiving means create a cancelled ticket which they send to the transmitting means which had sent the ticket 19 to indicate that the data has been received and executed.

The method consists of querying all transmitting means which have received said cancelled ticket 20 and of collecting all said tickets received last, said cancelled ticket containing the total sum of the value and/or the volume of all packets received by a station 2 for given ticket 19 transmitting means. The transmitting means and the receiving means sign and encrypt the data that they transmit.

This invention concerns an embedded system designed to be installed on a mobile telephony station 2, including data processing and storage means, wherein the system comprises means to take into account the cost of executing the data received by the station using information contained in a ticket received by the station 2 and/or of creating and sending a data item, called a ticket 23, to determine the volume and/or the value of a set of data transmitted by said station. The system includes means to create a data item called a cancelled ticket which will be sent by the station 2 to indicate that the data received by said station has been executed.

This invention concerns a mobile telephone including an embedded system reader designed to receive an embedded subscriber system 4 including data processing and storage means, wherein it comprises means to extract from a set of data received a data item, called a ticket, used to determine the volume and/or the value of said set of data received and to start processing of said ticket in order to take into account the cost of executing said data.

Although specific embodiments of the invention have been described and illustrated, the invention is not to be limited to the specific forms or arrangements of parts so descried and illustrated. The invention is limited only by the claims.

The invention claimed is:

1. A method to obtain the cost of transmitting a set of data from a service provider server computer to a end-user terminal, having a user associated therewith, via a cellular packet radio-communication network, the method comprising:
   the server computer:
      creating and sending, with the set of data, a data item, called a ticket, used to determine volume or value of said set of data transmitted;
      translating the set of data into a set of plurality of packets of a cellular packet radio communication network; and
      injecting into the set of a plurality of packets of a cellular packet an additional packet which is the ticket; and
   the end-user terminal:
      receiving the set of data including the ticket;
      determining the volume or the value of said set of a plurality of packets transmitted from the received ticket, said volume or said value being indicated by the received ticket; and
      processing the determined volume or value of the set of a plurality of packets according to a prescribed billing model and to determine whether financial rights associated with the user of the end-user terminal authorize access to the received data.

2. The method according to claim 1, further comprising operating the end-user terminal to check the financial rights of the end-user terminal and comparing the purchasing power of said end-user terminal with the amount required to execute said set of data received, amount indicated by said ticket.

3. The method according to claim 2, further comprising operating the end-user terminal to before checking the financial rights, to check the access rights of the end-user terminal to said set of data received.

4. The method according to claim 1, further comprising saving in a module of the end-user terminal the volume or the value of said set of data transmitted and of transmitting the stored data in order to determine the cost of transmission.

5. The method according to claim 1, wherein the ticket also contains one or more of the following items of information: the rank of the ticket in the set of packets transmitted with the ticket, the identity of the service provider, the certificate of the service provider, the serial number of said packets, the value of the packets to be returned to the end-user terminal, the type of data transmitted.

6. The method according to claim 1, further comprising updating counters of information concerning reception of the ticket and of said set of data in the end-user terminal.

7. The method according to claim 1, wherein, when the end-user terminal which have received said ticket have executed the set of data transmitted, said end user terminal creates a cancelled ticket which the end-user terminal sends to the service provider which had sent the ticket to indicate that the set of data has been received and executed.

8. The method according to claim 7, further comprising querying all providers which have received said cancelled ticket and of collecting all said tickets received last, said cancelled ticket containing the total sum of the value or the volume of all packets received by a station for given service provider.

9. The method according to claim 1, wherein the service provider and the end user terminal sign and encrypt the data that the transmitting and end-user terminal transmit, respectively.

10. The method according to claim 1, wherein the end-user terminal is a mobile telephone.

11. The method according to claim 1, comprising operating a smart card of the end-user terminal to analyze the received ticket.

12. The method according to any one of the previous claims, wherein:
- the end-user terminal is a mobile telephony station, the mobile telephony station extracts the ticket and sends the ticket to a subscriber card or a module included in the mobile telephony station, and
- the subscriber card or said module determines the volume or the value of said set of data transmitted from the extracted ticket.

* * * * *